UNITED STATES PATENT OFFICE.

JEAN EFFRONT, OF BRUSSELS, BELGIUM, AND AUGUSTE BOIDIN, OF SECLIN, FRANCE.

MANUFACTURE OF PRESSED YEAST.

1,176,528.    Specification of Letters Patent.    Patented Mar. 21, 1916.

No Drawing.    Application filed October 14, 1911.    Serial No. 654,568.

*To all whom it may concern:*

Be it known that we, JEAN EFFRONT and AUGUSTE BOIDIN, the first a subject of the King of Belgium, the second a citizen of the Republic of France, the first residing at 73 Avenue de Solbosch, Brussels, in the Kingdom of Belgium, the second at Seclin, Nord, in the Republic of France, have invented certain new and useful Improvements in the Manufacture of Pressed Yeast, of which the following is a specification.

In the manufacture of pressed yeast a very large proportion of malt has heretofore been necessary; thus ten times more diastase has been introduced into the mash than the quantity required for the saccharification. The use of this excess of malt is, however, justified on account of the necessity of providing the yeast with proper nutriment, that is to say, with nitrogen in the form of amids which is not found in sufficient quantity in non-germinated cereals. The result of the employment of large proportions of malt is to raise the cost price of the pressed yeast and to cause considerable loss of fermentable materials.

The object of our invention is wholly or partially to dispense with the employment of malt and to increase the yield of yeast and alcohol. This result is attained by submitting the grain or other amylaceous material to a special fermentation by the aid of micro-organisms in the course of which the nitrogenous substances of the cereals, etc., are rapidly rendered soluble and peptonized without occasioning any of the losses of fermentable materials due to malting.

The peptonization effected with the aid of micro-organisms has also the advantage that the operator can as required, cause the proportions of soluble nitrogen compounds, peptones, albumoses, and amids to be altered by varying the duration of the treatment and the quantity of air insufflated through the mash. By giving a large amount of air during a long time, a high percentage of amids is formed.

According to this invention we employ as a peptonizing agent proteolytic bacteria and preferably those belonging to the following species, viz: *Mesentericus*, *Tyrothrix*, *Subtilis*, and in a general way all ferments of nitrogenized materials met with in cheese industry and capable of playing an active part in the maturing of cheese. The bacteria referred to are described in the book of E. Macé, bearing the title "*Traite Pratique de Bacteriologie*," (*Practical Treatise of Bacteriology*) Paris, 1901, Librairie, J. B. Baillière & Fils, pages 964–978–981.

In order to obtain these peptonizing bacteria, which live on the surface of every kind of cereals, it suffices to wash the grain such as barley, for example, with tepid water, to rapidly heat the said water up to 80° C. after having added thereto a slightly alkaline solution of peptones and to maintain the said solution at 40° C. The development of bacteria capable of producing amids is thus facilitated. The various species so obtained are then separated on solid media and preferably the colonies which liquefy the gelatin are chosen. It then only remains to compare the activity of the isolated colonies by parallel cultivation upon albuminous substances in presence of an excess of calcium carbonate and in a current of air. The species thus chosen are then cultivated in alkalinized and aerated extracts of grain and peptones, albumoses, etc. The effect of the aeration is that the proteolytic properties of the bacteria are increased with the number of cultures.

We will describe some examples of the methods of operation which we have found to give good results.

1. The grain, such as maize, barley, rye, etc., or other amylaceous materials, tubers, etc., are boiled in contact with air, either atmospheric or under pressure by one of the known methods, then liquefied by a small proportion of malt, (one per cent. at least) at an elevated temperature of about 75° C., for example. It is cooled to about 40° C. and rendered slightly alkaline by means of an alkaline carbonate or alkaline earth. A leaven of peptonizing bacteria or peptonizing mold, is then added, the culture of peptonizing leaven or bacteria being used in the proportion of 1 to 5 liters per 100 kilograms of grain treated. It is then highly aerated. The operation is stopped when analysis shows that the major part of the nitrogenized material has become assimilable. The liquid is then brought to a temperature of 62°–64° C. in order to saccharify by malt (5 to 10% of malt suffices in this case) and the work is afterward continued either as in the top or Viennese process with thick wort, or as in the so called aero-yeast or bottom process with clear wort. In order to prevent the peptonizing bacteria from interfering in the course of the alcoholic fermentation, it is advisable to sterilize the mash before saccharification, or to render it antiseptic by means of various products such as fluorids, formaldehyde, etc., or by means of a slight acidification. In this example, instead of liquefying with one per cent. of malt at a temperature of 75° C. we can liquefy the starchy materials with diastases produced by molds or by bacteria, and the saccharification which takes place after peptonization can also be produced by means of molds as in the so called amylo process, so that the employment of malt is completely avoided.

2. Instead of peptonizing the liquefied extract, this operation can also be carried on after complete saccharification of the extract, but in this case the addition of an infusion of malt may become necessary during the fermentation to insure the success of the operation.

3. It is also of great advantage to peptonize the grain before boiling it. For this purpose the grain is moistened with water and heated to 40° C., the ferment is added and the liquid is aerated, until the major portion of the nitrogen compounds have become soluble. The cooking is afterward proceeded with and the liquid is then saccharified either by malt or in an aseptic medium, by molds in accordance with the usual processes, (amylo process for example.)

To sum up, the amylaceous materials may be submitted to the peptonizing fermentation before or after boiling and before or after saccharification.

In the examples above given the peptonization may be effected in a sterilized or non-sterilized medium with bacteria accompanied or not by antiseptics.

Having now particularly described and ascertained the nature of our said invention, and in what manner the same is to be performed, we declare that what we claim is:—

1. In a process for the manufacture of pressed yeast, subjecting the grain or other amylaceous materials, to a peptonization by means of proteolytic bacteria, acclimated by being passed several times in an assimilable alkaline and strongly aerated nitrogen containing medium.

2. In a process for the manufacture of pressed yeast, cooking the grain, and other amylaceous materials, adding thereto an alkaline substance and proteolytic bacteria, subjecting the mixture to a vigorous aeration, the said proteolytic bacteria having been acclimatized by being passed several times in an alkaline and strongly aerated nitrogen containing medium.

3. In a process for the manufacture of pressed yeast, cooking the grain or other amylaceous materials, liquefying the same by a slight proportion of malt at about 75° C., cooling to about 40° C., slightly alkalinizing the liquor, adding peptonizing bacteria, strongly aerating, stopping the fermentation when the greater part of the nitrogenated materials are rendered assimilable, heating the liquor to 62° to 64° C. and saccharifying the same by the malt, the said peptonizing bacteria being acclimatized by being passed several times into an alkaline and strongly aerated medium.

In testimony, that we claim the foregoing as our invention, we have signed our names in presence of two subscribing witnesses.

JEAN EFFRONT.
AUGUSTE BOIDIN.

Witnesses:
H. C. COXE,
MAURICE RAUX.

Copies of this patent may be obtained for five cents each, by addressing the "Commissioner of Patents, Washington, D. C."